United States Patent [19]

Sugimoto et al.

[11] 3,936,619

[45] Feb. 3, 1976

[54] FOUR-CHANNEL STEREOPHONIC REPRODUCING SYSTEM FOR REPRODUCING DISCRETE CD-4 FOUR-CHANNEL STEREO DISC

[75] Inventors: Yukio Sugimoto, Katano; Makoto Okamasa, Kyoto; Toyoshi Fukumura, Neyagawa, all of Japan

[73] Assignee: Matsushita Electric Industrial Co., Ltd., Osaka, Japan

[22] Filed: Apr. 24, 1974

[21] Appl. No.: 463,667

[30] Foreign Application Priority Data

Apr. 25, 1973 Japan ............................... 48-48030

[52] U.S. Cl. ..................179/100.4 ST; 179/1 GQ; 179/100.4 D

[51] Int. Cl.$^{2}$.... G11B 3/00; G11B 3/74; H04B 5/00

[58] Field of Search ........... 179/100.1 TD, 100.4 A, 179/100.4 D, 100.4 ST, 1 GQ, 15 BT

[56] References Cited

UNITED STATES PATENTS

| | | | |
|---|---|---|---|
| 3,686,471 | 8/1972 | Takahashi | 179/100.1 TD |
| 3,842,211 | 10/1974 | Metro | 179/15 BT |

*Primary Examiner*—Terrell W. Fears
*Assistant Examiner*—Stewart Levy
*Attorney, Agent, or Firm*—Stevens, Davis, Miller & Mosher

[57] ABSTRACT

There is provided a four-channel stereophonic reproducing system wherein each muting circuit comprises a limiter for limiting the carrier level of a frequency-modulated signal to a predetermined level, a control circuit actuated by the output of the limiter and a switching circuit controlled by the control circuit, whereby when the carrier level of the frequency-modulated signal decreases, the detected output of the sub-channel signal including a large amount of noise components is blocked by the muting circuit.

12 Claims, 8 Drawing Figures

FOUR-CHANNEL STEREOPHONIC REPRODUCING SYSTEM FOR REPRODUCING DISCRETE CD-4 FOUR-CHANNEL STEREO DISC

The present invention relates to a four-channel stereophonic reproducing system for reproducing discrete CD-4 four-channel stereo discs.

As in a conventional CD-4 system four-channel record disc, the left stereophonic composite signal is recorded on the left wall of a so-called 45—45 system groove. The left stereophonic composite signal comprises the sum of a first main channel signal and a first sub-channel signal, the first main channel signal consisting of the sum of first and second channel signals (CH1 + CH2) and the first sub-channel consisting of the frequency-modulated difference between the first and second channel signals F (CH1 − CH2). Similarly, the right stereophonic composite signal is recorded on the right wall of the 45—45 system groove. The right stereophonic composite signal comprises the sum of a second main channel signal and a second sub-channel signal, the second main channel signal consisting of the sum of third and fourth channel signals (CH3 + CH4) and the second sub-channel signal consisting of the frequency-modulated difference between the third and fourth channel signals F (CH3 − CH4).

Accordingly, when reproducing the record disc, the left and right stereophonic composite signals are picked up by a cartridge and the main channel signals separated from the associated sub-channel signals by means of filters to detect the sub-channel signals. The detected sub-channel signals are then added to and subtracted from the main channel signals to obtain four separate output signals corresponding to the first to fourth channel signals.

It is an object of the present invention to provide an improved four-channel stereophonic reproducing system comprising a muting circuit for detecting the carrier level of the frequency-modulated signals, whereby when the detected carrier level is lower than a predetermined value, the detected FM output is prevented from appearing at the output terminal to thereby prevent deterioration of the signal-to-noise ratio due to the decreased carrier level.

The above and other objects, features and advantages of the present invention will become readily apparent from considering the following detailed description taken in conjunction with the accompanying drawings, in which:

FIG. 1 is a block diagram showing an embodiment of a four-channel stereophonic reproducing system according to the present invention;

FIGS. 2*a* and 2*b* are output voltage waveform diagrams of the limiter used in the embodiment of FIG. 1;

FIGS. 2*c* and 2*d* are output voltage waveform diagrams of the differentiation circuit used in the embodiment of FIG. 1;

The present invention will now be described in greater detail with reference to the illustrated embodiments.

Figure 1:
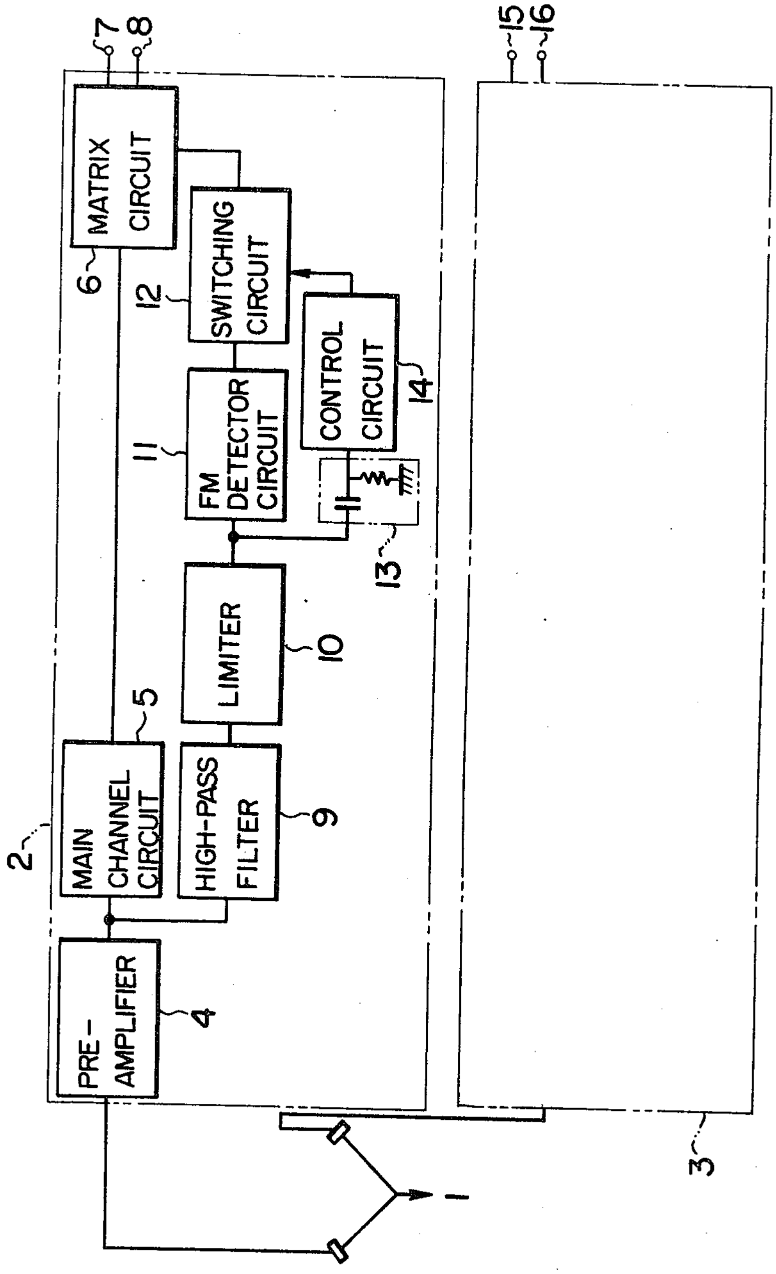

Referring first to FIG. 1 showing a first embodiment of the invention, numeral 1 designates a cartridge unit, 2 a reproducing section for the left channel signal picked up by the cartridge unit 1, 3 a reproducing section for the right channel signal picked up by the cartridge unit 1. In the embodiment of FIG. 1, the right channel signal reproducing section 3 is identical in construction and operation with the left channel signal reproducing section 2. Therefore, no detailed blocks of the section 3 are shown and its operation will not be described in the discussion to follow. Numeral 4 designates a preamplifier, 5 a main channel circuit including a low-pass filter for passing only the main channel signal component in the stereophonic composite signal, 6 a matrix circuit, 7 and 8 the output terminals of the matrix circuit 6. The main channel circuit 5 and the matrix circuit 6 constitute a main channel signal reproducing section.

Numeral 9 designates a high-pass filter for passing only the sub-channel signal component in the stereophonic composite signal, 10 a limiter for limiting the amplitude of the sub-channel signal obtained through the high-pass filter 9, 11 an FM detector circuit, 12 a switching circuit, 13 a differentiation circuit connected to the output terminal of the limiter 10, 14 a control circuit for controlling the switching circuit 12 with the output of the differentiation circuit 13. The high-pass filter 9, the limiter 10, the FM detector circuit 11, the switching circuit 12, the differentiation circuit 13 and the control circuit 14 constitute a sub-channel signal reproducing section, and a muting circuit is comprised of the limiter 10, the differentiation circuit 13, the control circuit 14 and the switching circuit 12. Numerals 15 and 16 designate the output terminals of the matrix circuit in the right channel signal reproducing section 3.

The embodiment of FIG. 1 operates as follows. The left and right stereophonic composite signals picked up by the cartridge unit 1 are applied respectively to the left and right channel reproducing sections 2 and 3. The left side stereophonic composite signal applied to the left channel reproducing section 2 is amplified by the preamplifier 4, and the main channel signal is then passed through the low-pass filter in the main channel circuit 5 and applied to the following matrix circuit 6. On the other hand, the sub-channel signal is passed through the high-pass filter 9 and it is then applied to the limiter 10. The output of the limiter 10 is detected by the detector circuit 11 and applied to the switching circuit 12, and it is also applied to the differentiation circuit 13.

Assuming now that the carrier level of the frequency-modulated signal is sufficiently high, the limiter 10 produces an output as shown in FIG. 2*a* and the differentiation circuit 13 produces an output as shown in FIG. 2*c*. In this case, therefore, the control circuit 14 produces a sufficiently high output and the switching circuit 12 is turned on. Consequently, the sub-channel signal is applied to the matrix circuit 6 where it is matrixed against the main channel signal, and thus the front and rear signals are produced at the output terminals 7 and 8.

Figure 2:
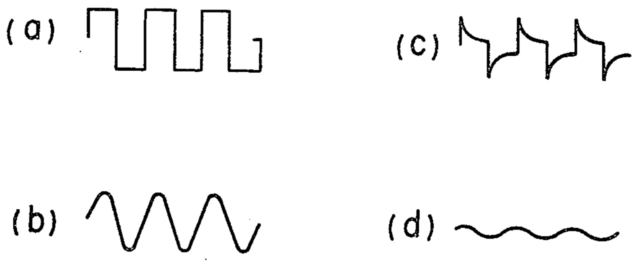

On the other hand, when the carrier level of the FM signal becomes lower than a predetermined value, the limiter 10 cannot perform its amplitude limiting function satisfactorily and thus it produces an output as shown in FIG. 2*b*. In this case, therefore, the differentiation circuit 13 produces an output as shown in FIG. 2 and the output of the control circuit 14 becomes extremely low. Consequently, the switching circuit 12 is turned off and the output of the detector circuit 11 is not supplied to the matrix circuit 6.

Figure 3:
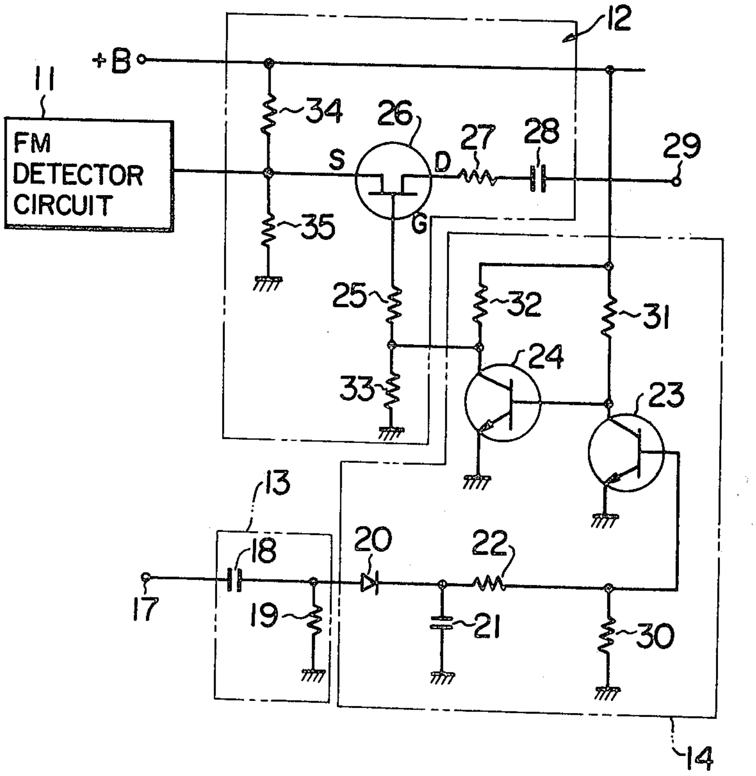
FIG. 3 is a schematic circuit diagram for the embodiment shown in FIG. 1.

FIG. 3 illustrates an exemplary circuit construction of the embodiment shown in FIG. 1, and in FIG. 3 the same reference numerals as used in FIG. 1 designate the identical component parts. The output signal of the limiter 10 is applied to an input terminal 17 so that it is differentiated by the differentiation circuit 13 comprising a capacitor 18 and a resistor 19 and it is then applied to the control circuit 14. In the control circuit 14, the differentiator output is detected by a diode 20 and it is then used to charge an integrating capacitor 21. This capacitor voltage is applied through a resistor 22 to the base of a first transistor 23 to turn it on and off.

When the carrier level of the FM signal is sufficiently high so that the differentiation circuit 13 produces the output shown in FIG. 2c, the first transistor 23 is turned on by the voltage on the capacitor 21 so that its collector potential decreases and thus the base potential of a second transistor 24 decreases to turn the second transistor 24 off. Consequently, the collector potential of the second transistor 24 increases and it raises through a resistor 25 the gate potential of an FET 26 constituting the switching circuit 12. When this occurs, the FET 26 is turned on and the output signal of the detector circuit 11 which was applied to the source of the FET 26 is passed to its drain. The detector output signal thus passed through the FET 26 is applied to the matrix circuit 6 through a resistor 27 and a capacitor 28 and through an output terminal 29.

On the contrary, when the carrier level of the FM signal is lower than the predetermined value so that the differentiation circuit 13 produces the output shown in FIG. 2d, the voltage on the capacitor 21 is low and the first transistor 23 is turned off. As a result, the second transistor 24 is turned on and the gate potential of the FET 26 decreases to turn it off. The output signal of the detector circuit 11 is thus blocked and it is not applied to the matrix circuit 6.

In FIG. 3, numerals 30, 31, 32, 33, 34 and 35 designate bias resistors.

It should be appreciated that with the abovedescribed embodiment, when the carrier level of the FM signal is sufficiently high, any noise may be practically eliminated by the amplitude limiting action of the limiter 10, whereas when the carrier level decreases below the predetermined value so that the amplitude limiting action is made practically inoperative, the switching circuit 12 is turned off to block the detector output itself. In either of these cases, therefore, an improved reproduction with a higher degree of freedom from noise may be ensured.

Figure 4:
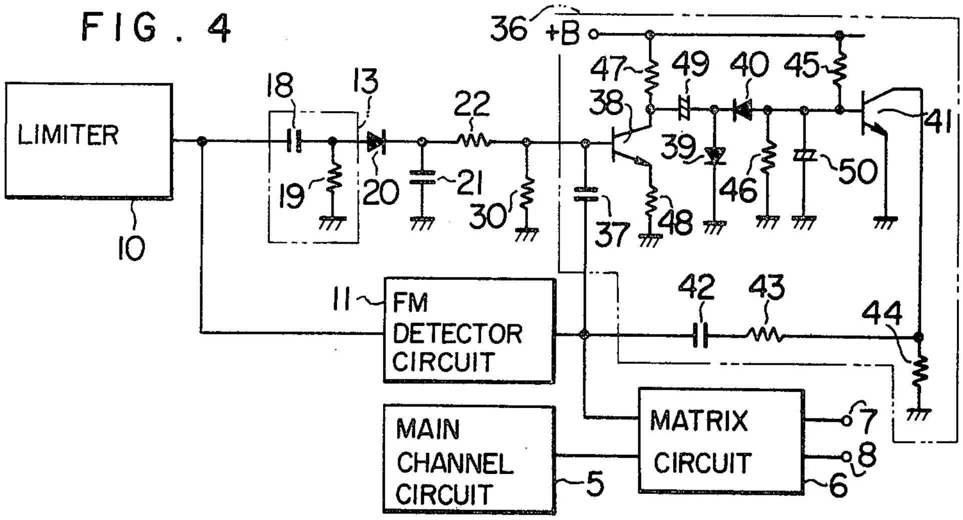
FIG. 4 is a schematic circuit diagram showing another embodiment of the present invention.

FIG. 4 illustrates a circuit diagram showing another embodiment of the present invention, in which the same reference numerals as used in FIGS. 1 and 3 designate the identical or equivalent component parts.

The embodiment of FIG. 4 differs from the embodiment shown in FIGS. 1 and 3 in that the switching circuit is comprised of a known type of Automatic Noise Reduction System (ANRS) designed to block the detector output and reduce the amount of noise when the signal level becomes low, and in this way the detector output is blocked when the carrier level of the FM signal decreases below a predetermined value.

In other words, the output signal of the limiter 10 is applied to both the differentiation circuit 13 and the detector circuit 11, and the detected output of the detector circuit 11 is applied to both the matrix circuit 6 and the ANRS 36.

When the signal level at the output terminal of the detector circuit 11 is sufficiently high, a third transistor 38 is turned on through a capacitor 37, and a large negative potential is applied to the base of a fourth transistor 41 by detector diodes 39 and 40 to turn it off. Consequently, the output of the detector circuit 11 is not applied to the fourth transistor 41, but it is applied to the matrix circuit 6 where it is matrixed against the main channel signal from the main channel circuit 5 to produce the front and rear signals at the output terminals 7 and 8.

On the other hand, when the signal level is low, the third transistor 38 is turned off and the +B voltage is applied to the base of the fourth transistor 41 to turn it on. As a result, the output of the detector circuit 11 is grounded through a capacitor 42, a resistor 43 and the fourth transistor 41 and it is not supplied to the matrix circuit 6. In FIG. 4, numerals 44, 45, 46, 47 and 48 designate resistors, and numerals 49 and 50 designate capacitors.

While the ANRS 36 operates in the manner described above, when the carrier level is sufficiently high so that the differentiation circuit 13 produces the output shown in FIG. 2*c*, the third transistor 38 is turned on and the fourth transistor 41 is turned off in the ANRS 36, thus supplying the output signal of the detector circuit 11 to the matrix circuit 6.

On the other hand, when the carrier level of the FM signal is lower than the predetermined value so that the differentiation circuit 13 produces the output shown in FIG. 2*d*, the third transistor 38 is turned off and the fourth transistor 41 is turned on, and thus the detector output is grounded through the fourth transistor 41 and not applied to the matrix circuit 6.

It will thus be seen that the embodiment of FIG. 4 employs the ANRS 36 in place of the switching circuit 12 to produce similar results to those produced by the embodiment shown in FIGS. 1 and 3.

Figure 5:
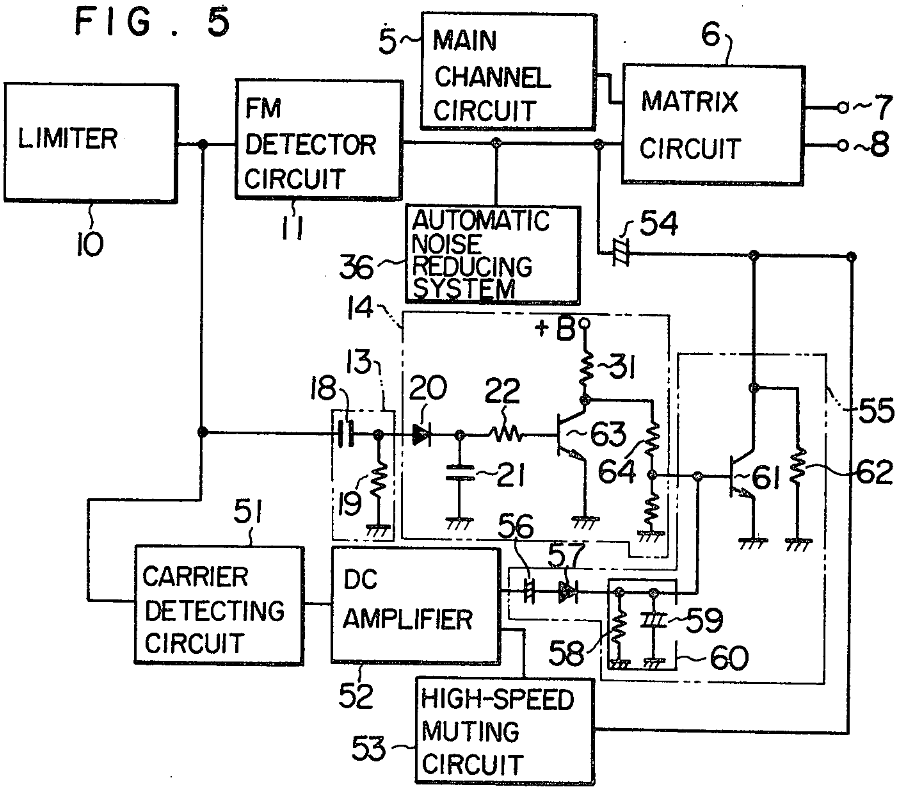
FIG. 5 is a schematic circuit diagram showing still another embodiment of the present invention.

FIG. 5 illustrates still another embodiment of the invention, and the component parts identical in function with those of the embodiments shown in FIGS. 1, 2 and 4 are designated by the same reference numerals. This embodiment differs from the first two embodiments in that the muting function is performed by not only detecting the presence of the carrier, but also in accordance with the magnitude of the carrier wave.

In FIG. 5, numeral 51 designates a detecting circuit for detecting the presence of a carrier wave, 52 a DC amplifier which serves the function of amplifying the output signal of the detecting circuit 51 in addition to its switching function. Numeral 53 designates a high speed muting circuit whereby when there is no carrier wave, the output of the detector circuit 11 is grounded through a capacitor 54 to block the application of the detector output to the matrix circuit 6. Numeral 55 designates a long time muting circuit whereby when the carrier wave is intermittently and continually off so that it is impossible for the high speed muting circuit 53 to perform the muting function accurately, the long time muting circuit 55 is switched into operation by the DC amplifier 52 to perform the muting function. In other words, the long time muting circuit 55 comprises a capacitor 56, a diode 57, a time constant circuit 60 having a long time constant and comprised of a resistor 58 and a capacitor 59, a fifth transistor 61 and a resistor 62, whereby when the carrier wave has been off for several times, the capacitor 59 is charged sufficiently to turn the fifth transistor 61 on. Accordingly, when a situation arises continually where the output signal of the DC amplifier 52 includes no carrier wave so that it is impossible for the high speed muting circuit 53 to respond to the output signal of the DC amplifier 52 satisfactorily, the long time muting circuit 55 is brought into operation and the fifth transistor 61 is turned on to ground the output signal of the detector circuit 11 through the capacitor 54 and the fifth transistor 61 and thereby prevent the application of the detector output to the matrix circuit 6.

In the present embodiment, the fifth transistor 61 of the long time muting circuit 55 is also utilized to construct the switching circuit.

In other words, when the carrier level is sufficiently high so that the differentiation circuit 13 produces the output signal shown in FIG. 2*c*, a sixth transistor 63 constituting the control circuit 14 is turned on and the fifth transistor 61 of the long time muting circuit 55 is turned off, thus supplying the output signal of the detector circuit 11 to the matrix circuit 6.

On the other hand, when the carrier level is lower than the predetermined value so that the differentiation circuit 13 produces the output shown in FIG. 2d, the sixth transistor 63 is turned off and the +B voltage is applied to the base of the fifth transistor 61 through the resistors 31 and 64 to turn it on. Consequently, the output of the detector circuit 11 is grounded through the capacitor 54 and the fifth transistor 61 and the application of the detector output to the matrix circuit 6 is prevented.

With the arrangement described above, it is possible to obtain the same results as the embodiment shown in FIGS. 1 and 3.

While, in the embodiments of this invention described hereinbefore, the output of the limiter 10 is differentiated by the differentiation circuit 13, this is done with the intention of increasing the range of variation of the output signal of the limiter 10 to prevent any erroneous operation, and therefore it would be apparent to those skilled in the art that the same results may be obtained without the provision of the differentiation circuit 13, if the circuitry is designed suitably.

What we claim is:

1. A four-channel stereophonic reproducing system for reproducing a discrete CD-4 four-channel stereo disc wherein left and right stereophonic composite signals are recorded on the left and right walls of the groove on said disc, said left stereophonic composite signal comprising the sum of a first main channel signal and a first sub-channel signal and said right stereophonic composite signal comprising the sum of a second main channel signal and a second sub-channel signal, said first main channel signal comprising the sum of first and second channel signals and said second main channel signal comprising the sum of third and fourth channel signals, said first sub-channel signal comprising the frequency-modulated difference between said first and second channel signals and said second sub-channel signal comprising the frequency-modulated difference between said third and fourth channel signals, comprising means for reproducing a main channel signal and a sub-channel signal having a carrier from each of left and right stereophonic composite signals recorded on said disc;

detector means for detecting said sub-channel signals reproduced by said reproducing means;

matrix means for matrixing said main channel signals reproduced by said reproducing means and output signals from said detector means to produce four discrete stereophonic audio signals;

switching means provided between said detector means and said matrix means;

level discriminating means for detecting when the carrier level of a sub-channel signal is lower than a predetermined value; and control means controlled by the output of said level discriminating means whereby, when said carrier level becomes lower than said predetermined value, said switching means is rendered nonconductive to prevent application of the output of said detector means to said matrix means.

2. A system according to claim 1, wherein said level discriminating means comprises a pair of detecting units each connected to an input of said detector means.

3. A system according to claim 1, wherein said detecting means comprises a pair of detecting units each thereof consisting of a limiter connected to an input of said detector means, and a differentiation circuit connected to the output of said limiter.

4. A system according to claim 1, wherein said control means comprises a pair of control units each thereof consisting of a diode coupled to the output of said level discriminating means, a capacitor charged by the output of said diode, a first transistor having the base thereof connected to said capacitor, and a second transistor having the base thereof connected to the collector of said first transistor, and wherein said switching means comprises a pair of switching units each thereof consisting of a field effect transistor having its gate connected to the collector of said second transistor, its source connected to an output terminal of said detector means and its drain connected to an input terminal of said matrix means.

5. A four-channel stereophonic reproducing system for reproducing a discrete CD-4 four-channel stereo disc wherein left and right stereophonic composite signals are recorded on the left and right walls of the groove in said disc, said left stereophonic composite signal comprising the sum of a first main channel signal and a first sub-channel signal and said right stereophonic composite signal comprising the sum of a second main channel signal and a second sub-channel signal, said first main channel signal comprising the sum of first and second channel signals and said second main channel signal comprising the sum of third and fourth channel signals, said first sub-channel signal comprising the frequency-modulated difference between said first and second channel signals and said second sub-channel signal comprising the frequency-modulated difference between said third and fourth channel signals, comprising means for reproducing a main channel signal and a sub-channel signal having a carrier from each of left and right stereophonic composite signals recorded on said disc;

detector means for detecting said sub-channel signals reproduced by said reproducing means;

matrix means for matrixing said main channel signals reproduced by said reproducing means and output signals from said detector means to produce four discrete stereophonic audio signals;

switching means provided between said detector means and said matrix means;

level discriminating means for detecting when the carrier level of said sub-channel signal is lower than a predetermined value; and automatic noise reduction means responsive to the output of said detector means to prevent the application of the output of said detector means to said matrix means when the signal level of the output of said detector means is low, whereby when the carrier level of said sub-channel signal becomes lower than said predetermined value, said automatic noise reduction means is actuated by the output of said detecting means to prevent the application of the output of said detector means to said matrix means.

6. A system according to claim 5, wherein said level discriminating means comprises a pair of limiters each connected to an input of said detector means.

7. A system according to claim 5, wherein said detecting means comprises a pair of detecting units each thereof consisting of a limiter connected to an input of said detector means, and a differentiation circuit connected to the output of said limiter.

8. A system according to claim 5, wherein said automatic noise reduction means comprises a pair of automatic noise reduction units each thereof consisting of a third transistor having the base thereof connected to an output terminal of said detector means, and a fourth transistor having its collector connected to the output terminal of said detector means and its base connected to the collector of said third transistor through a detector diode, and wherein the output terminal of said level discriminating means is connected to the base of said third transistor.

9. A four-channel stereophonic reproducing system for reproducing a discrete CD-4 four-channel stereo disc wherein left and right stereophonic composite signals are recorded on the left and right walls of the groove in said disc, said left stereophonic composite signal comprising the sum of a first main channel signal and a first sub-channel signal and said right stereophonic composite signal comprising the sum of a second main channel signal and a second sub-channel signal, said first main channel signal comprising the sum of first and second channel signals and said second main channel signal comprising the sum of third and fourth channel signals, said first sub-channel signal comprising the frequency-modulated difference between said first and second channel signals and said second sub-channel signal comprising the frequency-modulated difference between said third and fourth channel signals, comprising means for reproducing a main channel signal and sub-channel signal having a carrier from each of left and right sterephonic composite signals recorded on said disc;

detector means for detecting said sub-channel signals reproduced by said reproducing means;

matrix means for matrixing said main channel signals reproduced by said reproducing means and output signals from said detector means to produce four discrete stereophonic audio signals;

level discriminating means for detecting when the carrier level of said sub-channel signal is lower than a predetermined value;

muting means connected to the output of said level discriminating means for detecting the presence of carrier whereby, when there is no carrier wave in the output of said level discriminating means, said muting means is actuated to prevent the application of the output of said detector means to said matrix means; and control means controlled by the output of said level discriminating means for actuating said muting means to prevent the application of the output of said detector means to said matrix means when said carrier level becomes lower than said predetermined value.

10. A system according to claim 9, wherein said level discriminating means comprises a pair of limiters each connected to an input of said detector means.

11. A system according to claim 9, wherein said level discriminating means comprises a pair of limiters each connected to an input of said detector means, and a differentiation circuit connected to the output of said limiter.

12. A system according to claim 9, wherein said muting means comprises a pair of muting units each thereof consisting of means for detecting the presence of carrier wave in the output signal of said level discriminating means, a diode for detecting the output of said carrier detecting means, and a fifth transistor having its collector connected to an output terminal of said detector means, its base connected to said diode and its emitter connected to ground, and wherein said control means comprises a pair of control units each thereof consisting of a diode for detecting the output of said level discriminating means, a capacitor charged by the output of said diode and a sixth transistor having its base connected to said capacitor and its collector connected to the base of said fifth transistor.

* * * * *